United States Patent
Casazzone et al.

(10) Patent No.: US 12,212,057 B2
(45) Date of Patent: Jan. 28, 2025

(54) EXTERIOR ACCESSORY CLEAT WITH INTEGRATED ANTENNA

(71) Applicant: ZEBRA TECHNOLOGIES CORPORATION, Lincolnshire, IL (US)

(72) Inventors: Nicolas F Casazzone, Dix Hills, NY (US); Sripathi Yarasi, Fort Lauderdale, FL (US); Michele B. Feinstein, Oceanside, NY (US)

(73) Assignee: Zebra Technologies Corporaiton, Lincolnshire, IL (US)

( * ) Notice: Subject to any disclaimer, the term of this patent is extended or adjusted under 35 U.S.C. 154(b) by 386 days.

(21) Appl. No.: 17/675,863

(22) Filed: Feb. 18, 2022

(65) Prior Publication Data
US 2023/0268645 A1    Aug. 24, 2023

(51) Int. Cl.
*H01Q 1/52*   (2006.01)
*H01Q 13/10*  (2006.01)
*H04M 1/02*   (2006.01)
*H01Q 1/24*   (2006.01)

(52) U.S. Cl.
CPC ............ *H01Q 1/528* (2013.01); *H01Q 13/10* (2013.01); *H04M 1/0266* (2013.01); *H01Q 1/243* (2013.01)

(58) Field of Classification Search
None
See application file for complete search history.

(56) References Cited

U.S. PATENT DOCUMENTS

2008/0268908 A1* 10/2008 Chen .................... H01Q 9/0421
                                                                      455/562.1
2014/0292590 A1* 10/2014 Yoo ........................ H01Q 5/371
                                                                      343/702

* cited by examiner

*Primary Examiner* — Frantz Bataille

(57) ABSTRACT

A mobile computing device includes: a display; a device housing supporting the display and having a wall defining an exterior surface; a communications controller supported within a device interior enclosed between the display and the device housing; a cleat affixed to the exterior surface of the wall and configured to couple an accessory to the device housing, the cleat including a conductive antenna element; and a feed connector having an exterior end electrically coupled with the conductive antenna element of the cleat, an interior end electrically coupled with the communications controller, and a body traversing the wall to join the exterior and interior ends.

20 Claims, 11 Drawing Sheets

EXTERIOR ACCESSORY CLEAT WITH INTEGRATED ANTENNA

BACKGROUND

The development of radio access technologies (e.g., 5G, Wi-Fi 6E, and the like) and the incorporation of such technologies into mobile communication devices alongside earlier technologies (e.g., 4G), may involve the deployment of additional communications hardware in such devices. In particular, enabling additional radio access technologies may involve implementing addition antenna assemblies in mobile computing devices. Mobile devices such as smartphones and other handheld devices may have limited physical space to accommodate such communications hardware, and the deployment of additional components such as antenna assemblies may lead to suboptimal communications performance for the additional antenna assemblies, other previously deployed components, or both.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
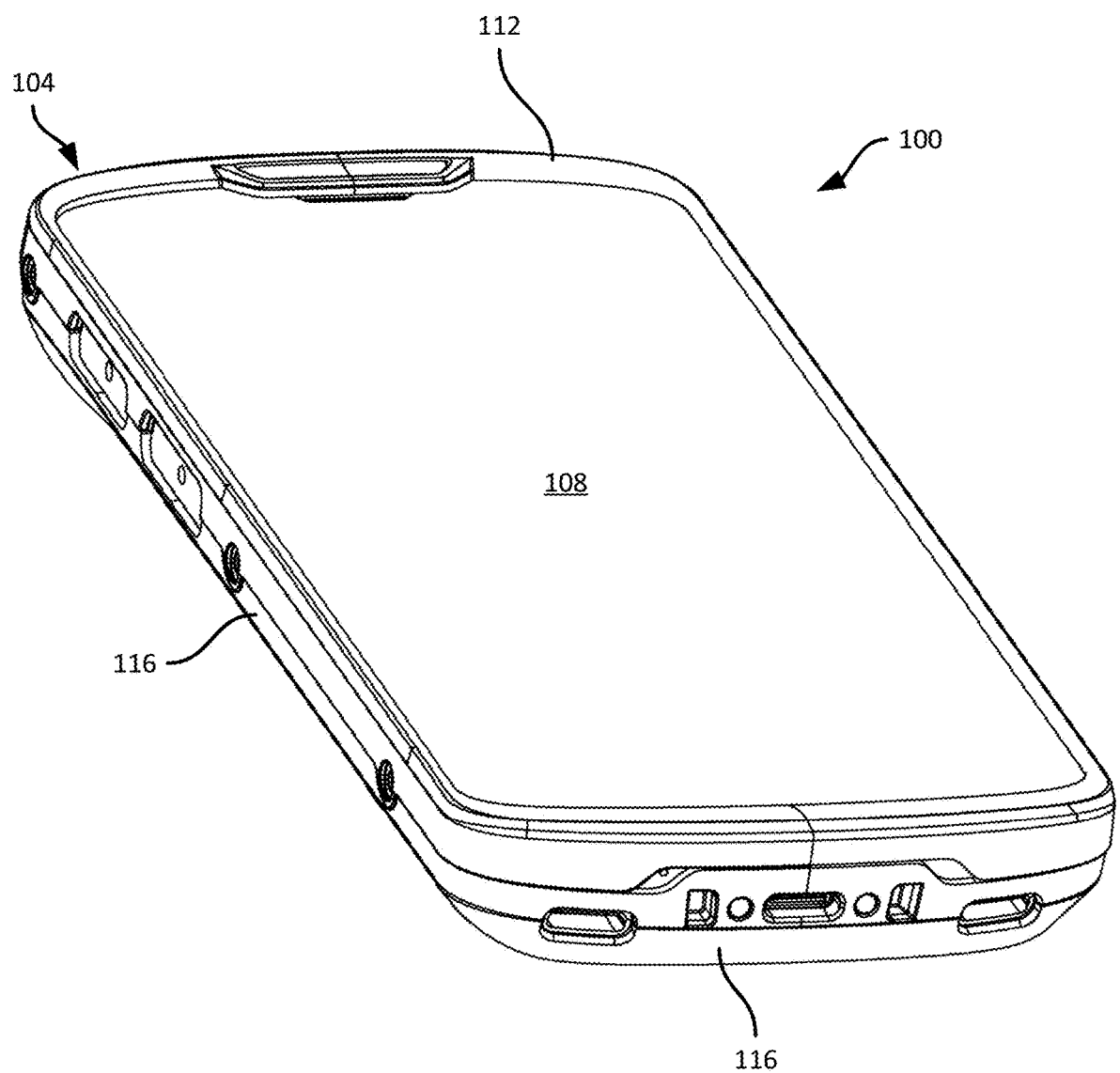
FIG. 1 is a diagram showing a front of a mobile computing device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a mobile computing device, including: a display; a device housing supporting the display and having a wall defining an exterior surface; a communications controller supported within a device interior enclosed between the display and the device housing; a cleat affixed to the exterior surface of the wall and configured to couple an accessory to the device housing, the cleat including a conductive antenna element; and a feed connector having an exterior end electrically coupled with the conductive antenna element of the cleat, an interior end electrically coupled with the communications controller, and a body traversing the wall to join the exterior and interior ends.

Additional examples disclosed herein are directed to a mobile computing device, comprising: a device housing having a wall defining an exterior surface, the device housing defining a device interior; a communications controller supported within the device interior; a conductive cleat affixed to the exterior surface of the wall and configured to couple an accessory to the device housing; and a feed connector extending from the device interior, through the wall, to the conductive cleat to electrically couple the conductive cleat with the communications controller.

FIG. 1 illustrates a mobile computing device 100, such as a smart phone or other mobile computer, such as a tablet computer, a wearable computer such as a hand- or finger-mounted barcode scanner, and the like. The device 100 includes a housing 104 supporting various other components of the device 100. Those other components include a display 108 supported by the housing and, in the illustrated example, surrounded by a bezel surface 112 defined by the housing 104. The housing 104 includes one or more walls in this example, including a set of side walls 116 (four, in the present example, two of which are visible in FIG. 1), and a back wall opposite the display 108. The walls of the housing 104 define various exterior surfaces of the device 100. For example, the walls 116 define exterior side surfaces of the device 100. The display 108 itself also forms an exterior front surface of the device 100. The above-mentioned back wall (not visible in FIG. 1) defines an exterior back surface of the device 100. As will be apparent to those skilled in the art, the specific arrangement of walls and exterior surfaces of the device 100 depend on the nature of the device. For example, some devices, such as the hand-mounted barcode scanners mentioned above, may lack a display.

Enclosed between the housing 104 and the display 108 is a device interior. The device interior is a volume in which a variety of internal components of the device 100 are supported, and is substantially or entirely isolated from the exterior of the device 100 by the housing 104 and display 108. The above-mentioned internal components can include controllers, storage devices, communications hardware, circuit boards and/or other support members, and the like. The above-mentioned communications hardware include one or more wireless communications interfaces. Each communications interface, in turn, can include a respective radio and/or baseband controller, as well as one or more antennas controllable to transmit and/or receive wireless signals. The communications interfaces can, for example, implement distinct wireless communications standards (e.g. Wi-Fi, cellular standards such as 4G, 5G and the like).

Antenna performance (e.g. radiation patterns, gain, efficiency, etc.) can be affected not only by the geometry of the antenna, but also by the physical environment in which the antenna is deployed. Proximity to internal components such as the above mentioned controllers and the like, as well as to ground planes formed by printed circuit boards (PCBs), can negatively affect antenna performance. Increasing the distance between the antennas and other internal components of the device 100 can mitigate such negative effects. However, space within the device interior may be tightly constrained, such that little or no space is available in which to deploy an antenna without negatively affecting the performance of that antenna, other device components, or both. The challenge of selecting locations for antennas within the device interior while mitigating negative effects on antenna performance by neighboring components is magnified with each additional antenna to be implemented, e.g., to support additional radio access technologies.

As will be discussed below, the device 100 therefore includes certain features enabling the implementation of one or more antennas outside the device interior, while mitigating the need to provide the housing 104 with additional structural elements to support such antennas.

Figure 2:
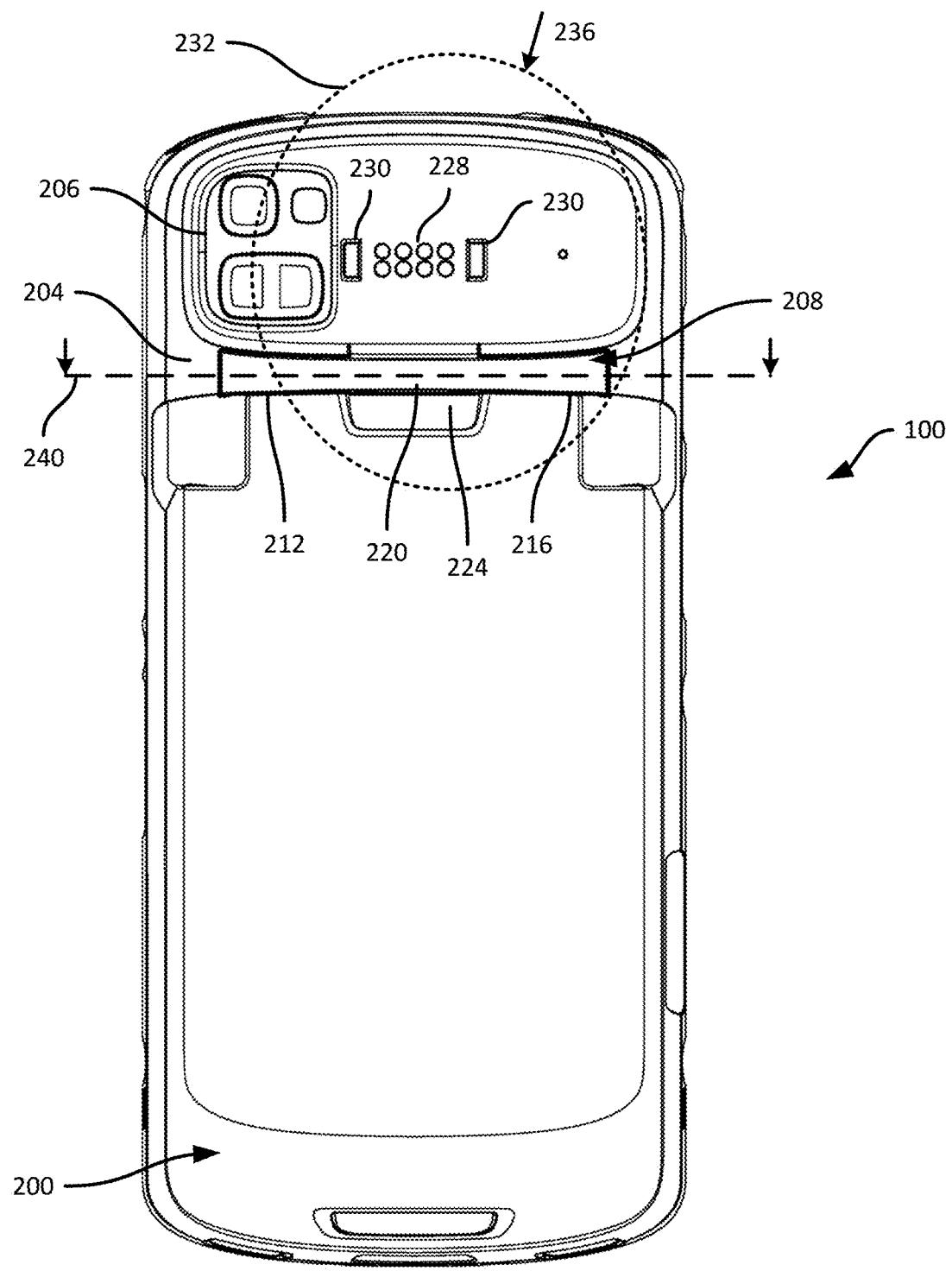
FIG. 2 is a diagram showing a back of the mobile computing device of FIG. 1.

Turning to FIG. 2, the device 100 is shown from the back (i.e. the side of the device 100 opposite the display 108 shown in FIG. 1). The housing 104, as noted earlier, includes a back wall 200 substantially parallel to the display 108 and defining an exterior back surface 204. Certain other components are visible on the back surface 204, such as a set of apertures 206 for cameras, illumination devices, or the like. The device 100 further includes a cleat 208 affixed to the back surface 204 and configured to couple an accessory to the housing 104.

The cleat 208 extends outwards from the back surface 204, thus providing a protrusion from the back surface 204 configured to engage with an accessory placed adjacent to the back surface 204. A wide variety of accessories may be coupled to the device 100 via the cleat 208 (although not necessarily simultaneously), and the specific physical configuration of the cleat 208 can be selected based on the accessory or accessories intended for use with the cleat 208. In the illustrated example, the cleat 208 enables a carrying strap to be affixed to the device 100. The cleat 208 includes opposing end portions 212 and 216 that abut the back surface 204. As will be discussed further below, the end portions 212 and 216 are affixed to the housing 104, e.g., via fasteners. The cleat 208 also includes a central portion 220 extending between the end portions 212 and 216. The shape of the central portion 220, and/or the shape of the back surface 204, provide a gap 224 between the central portion 220 and the back surface 204. A carrying strap can be inserted through the gap and looped around the central portion 220, for example.

Other accessories can also be affixed to the device 100 using the cleat 208, e.g. by clamping onto or otherwise engaging with the cleat 208. Some accessories perform functions involving communication and/or power delivery between the accessories and the device 100. Those accessories can, for example, interface with the device 100 via electrical contacts 228 on the back surface 204. The back surface 204 can also include recesses 230 or other suitable locating features for cooperating with such an accessory. That is, some accessories can engage with the cleat 208 via a strap, a clamp, a snap fitting, or the like, and when so engaged can also engage with the back surface 204 to connect accessory contact points with the contacts 228.

Figure 3:
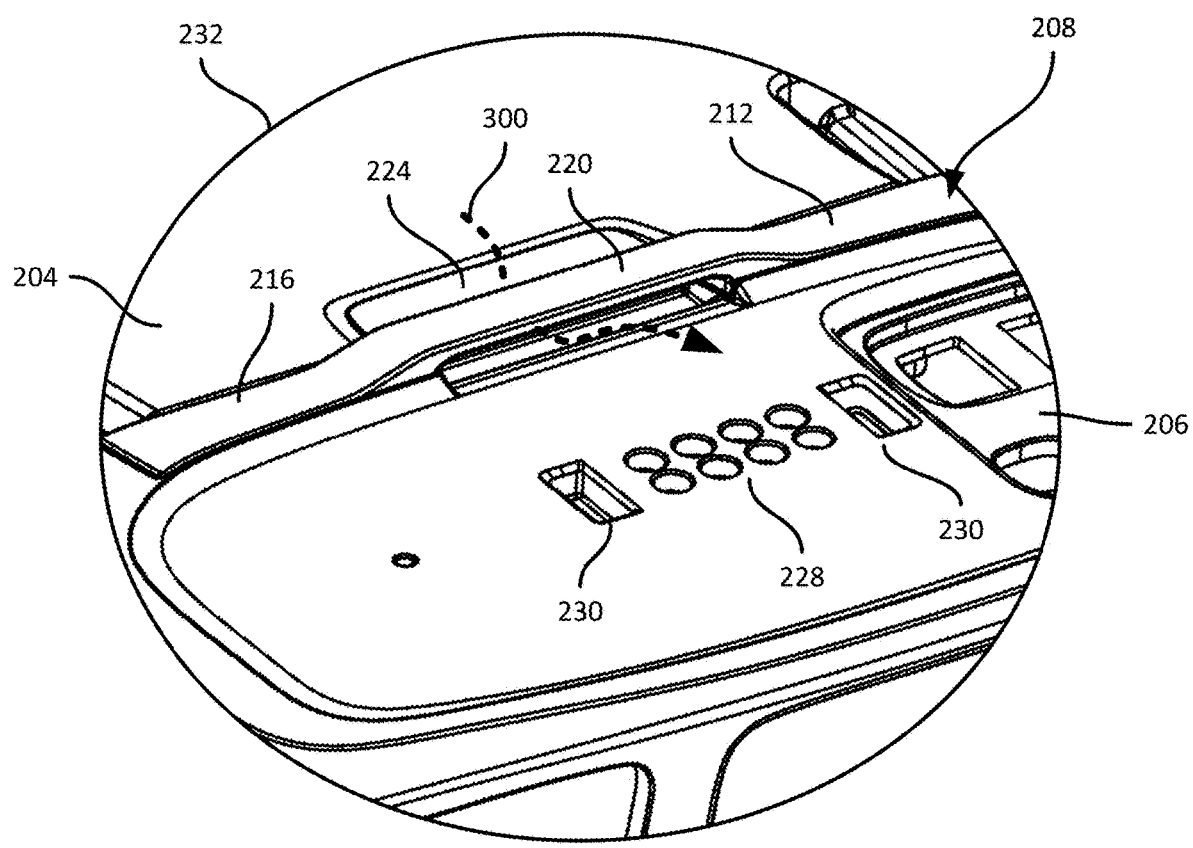
FIG. 3 is a diagram showing a detailed view of a portion of the device back of FIG. 2.

Another view of the cleat 208, illustrating a portion 232 of the device 100 from a viewing direction 236, is shown in FIG. 3. FIG. 3 better illustrates the gap 224, through which a strap can be inserted, for example, following a path 300. In other examples, the cleat 208 need not form a gap between a portion thereof and the back surface 204. That is, a variety of cleat structures other than the structure illustrated herein can also be implemented, depending on the nature of the accessory or accessories to be affixed to the device 100.

In addition to being configured to couple an accessory to the device 100, the cleat 208 is also configured to operate as an antenna, thus enabling the deployment of an antenna for the device 100 while mitigating the impact of such deployment on the space available in the device interior. Further, in some examples an antenna deployed in the cleat 208 may experience reduced interference from other internal components of the device 100, by virtue of being separated from such components by the housing 104.

To that end, the cleat 208 includes a conductive antenna element. The device 100 also includes a feed connector that traverses the back wall 200 between the above-mentioned conductive element and the device interior, which contains a communications controller. The feed connector electrically connects the conductive antenna element to the communications controller. The communications controller, in turn, can apply electrical signals to the conductive antenna element to cause the conductive antenna element to generate wireless transmissions, and/or receive electrical signals from the conductive antenna element indicative of wireless transmissions received at the conductive antenna element.

Figure 4:
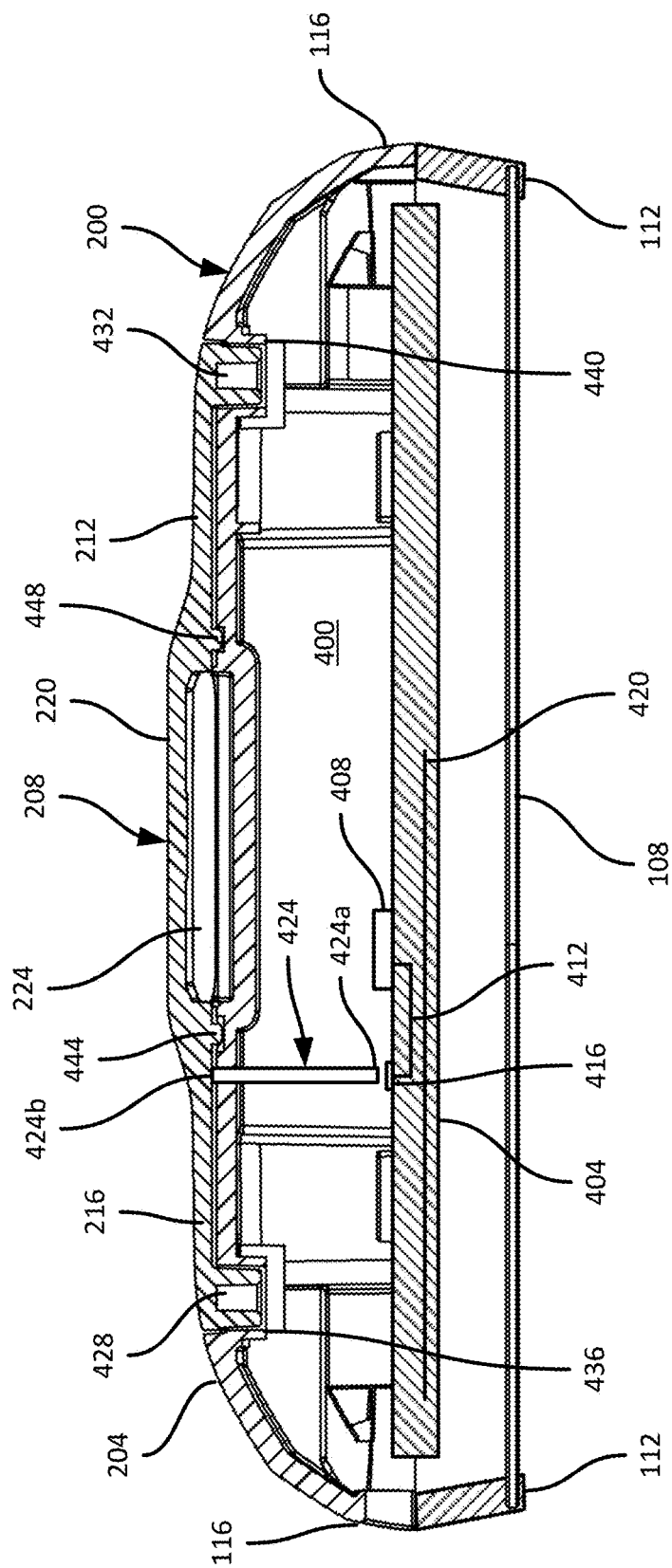
FIG. 4 is a diagram showing a cross section of the device of FIG. 1.

Turning to FIG. 4, a cross section of the device 100, taken at the plane 240 shown in FIG. 2, is illustrated. FIG. 4 reveals the device interior 400 enclosed between the housing 104 (in particular, the back wall 200 and the side walls 116) and the display 108. The device interior 400 contains various components of the device 100, some of which are omitted for clarity. Among the interior components illustrated in FIG. 4 are a support 404, such as a PCB. The support 404 carries a communications controller 408, which can be implemented as an integrated circuit package or other suitable format, and affixed to the support 404. The support 404, in turn, contains traces or other conductors to interconnect the controller 408 with other electrical components of the device 100. In particular, the support 404 includes a conductor 412 interconnecting the controller 408 with a feed port 416, such as a conductive pad, patch or the like on a surface of the support 404. The support 404 also includes a ground plane 420, e.g., in the form of a layer of conductive material (e.g., copper or the like) within the support 404.

The device 100 also includes a feed connector 424 with an interior end 424*a* (i.e., located in the device interior 400), and an exterior end 424*b* (i.e., outside the device interior 400). A body of the feed connector 424 joins the ends 424*a* and 424*b*, traversing the back wall 200 in doing so. Thus, as seen in FIG. 4, the exterior end 424*b* of the feed connector 424 is electrically coupled to the cleat 208 (e.g., by direct mechanical engagement). The interior end 424*a*, on the other hand, is electrically coupled to the feed port 416. In the present example, the feed connector 424 is not mechanically connected directly with the feed port 416, but is instead electrically coupled with the feed port 416. In other embodiments, the feed connector 424 is mechanically connected directly with the feed port 416.

As will be apparent, therefore, the feed connector 424 electrically connects the cleat 208 with the feed port 416 (and therefore the controller 408), through the back wall 200. The cleat 208, in this example, is fabricated from a conductive material, such as aluminum or any other suitable conductor. The entire cleat 208 is therefore a conductive antenna element. In other examples, the cleat 208 can include a conductive antenna element encased or otherwise coated in a protective material. In such examples, the cleat 208 can also include an exposed portion of the conductive antenna element, enabling the conductive antenna element to physically engage the exterior end 424*b* of the feed connector 424. The feed connector 424 can be provided in the form of a conductive pin, e.g. of aluminum or other suitable material. In other examples, the feed connector 424 can be a strip or trace of conductive material travelling along an interior surface of the housing 104.

FIG. 4 also illustrates an example mechanism for affixing the cleat 208 to the back wall 200 of the housing 104. In the illustrated example, the cleat 208 includes recesses 428 and 432 in the end portions 212 and 216, respectively. The back wall 200 also includes openings 436 and 440 corresponding to the recesses 428 and 432. When the cleat 208 is placed against the back surface 204 of the back wall 200, the recesses 428 and 432 are aligned with the openings 436 and 440, respectively. During assembly of the device 100, fasteners such as screws or the like can therefore be inserted from the device interior 400 into the recesses 428 and 432 (prior to installation of the support 404 and the display 108). The fasteners therefore affix the cleat 208 to the housing 104, with an interior surface of the end portions 212 and 216 abutting against the back surface 204.

In some examples, as illustrated in FIG. 4, the cleat 208 can include locating protrusions 444 and 448, configured to engage with corresponding recesses in the back wall 200, for locating the cleat 208 prior to installation of the above-mentioned fasteners.

In other examples, the cleat 208 can be affixed to the housing 104 by other mechanisms, such as fasteners inserted from the exterior of the device 100, adhesives, or the like. In still other examples, the cleat 208 can be fabricated with the back wall 200, e.g., by overmolding the back wall 200 onto the conductive antenna element of the cleat 208.

Figure 5:
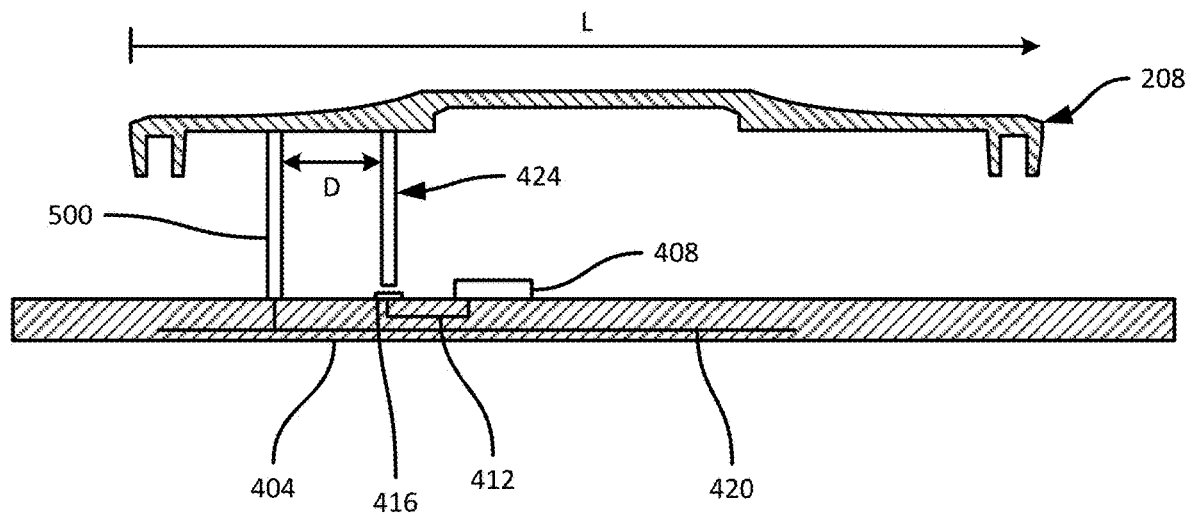
FIG. 5 is a simplified cross section of a mobile computing device, showing an example antenna configuration.

Turning to FIG. 5, a simplified view of the cleat 208 and the support 404 is shown, illustrating additional features of the cleat 208 provided in certain embodiments. In particular, as shown in FIG. 5, the device 100 includes, in addition to the feed connector 424, a shorting connector 500 such as a conductive pin or a conductive trace on an interior surface of the housing 104. As will now be apparent to those skilled in the art, the cleat 208 can therefore implement a planar inverted-F antenna (PIFA).

The shorting connector 500 is connected at one end to the ground plane 420 (e.g., via traces, pads and the like of the support 404), and at another end to the conductive antenna element of the cleat 208. As will be apparent, the position of the shorting connector 500 along a length L of the cleat 208 (measured parallel to the ground plane 420), as well as a distance D (also measured parallel to the ground plane 420) between the shorting connector 500 and the feed connector 424, may both be selected according to performance targets for the antenna implemented by the cleat 208. For example, the performance targets can include a frequency band over which the antenna radiates and/or detects radiation.

Figure 6:
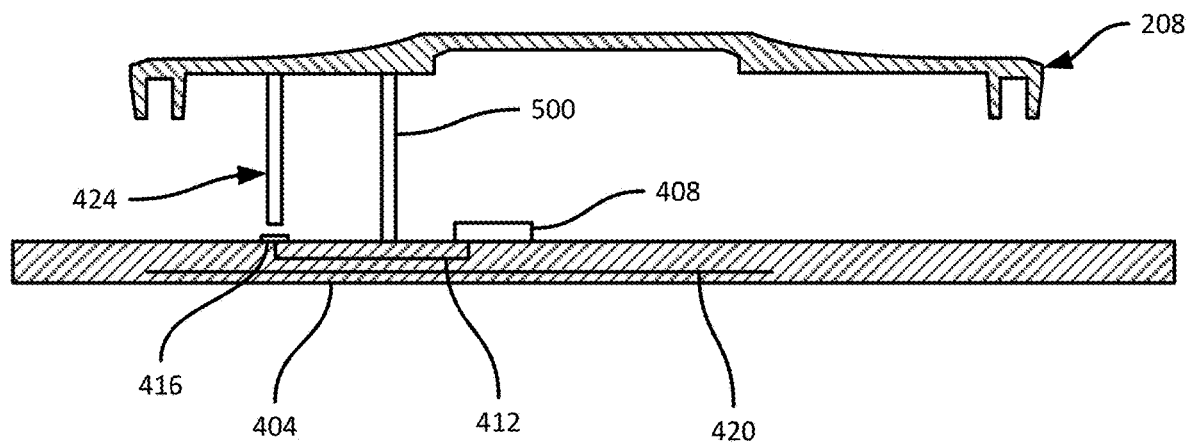
FIG. 6 is a simplified cross section of a mobile computing device, showing an example antenna configuration.

As shown in FIG. 6, for example, the positions of the feed connector 424 and the shorting connector 500 can vary, depending on the above-mentioned performance targets. In FIG. 6, the feed connector 424 is closer to an end of the cleat 208 than the shorting connector 500, whereas FIG. 5 illustrates the opposite arrangement (with the shorting connector 500 closer to an end of the cleat 208 than the feed connector 424).

Figure 7:
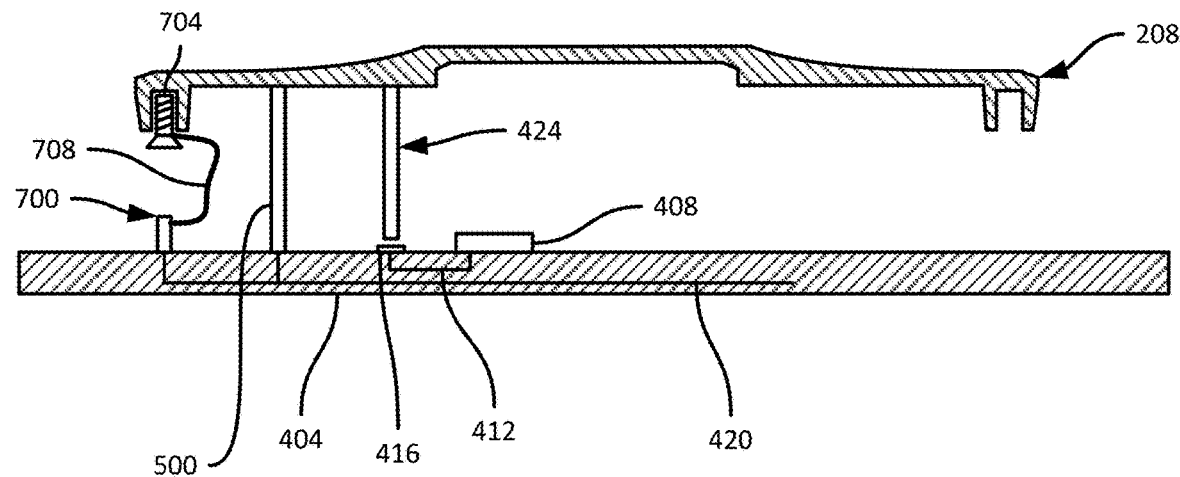
FIG. 7 is a simplified cross section of a mobile computing device, showing an example antenna configuration including a shorting connector.

Turning to FIG. 7, a further example is illustrated in which the cleat 208 is connected with the ground plane 420 via the shorting connector 500 and a second shorting connector 700. As with the shorting connector 500, additional shorting connectors such as the second shorting connector 700 can be deployed to further tune the antenna performance of the cleat 208. In other examples, further additional shorting connectors can be provided.

The shorting connector 700 includes a plurality of components. In particular, the shorting connector 700 includes a fastener 704 used, as mentioned earlier, to affix the cleat 208 to the back wall 200. The fastener 704 is conductive, and the shorting connector 700 further includes a conductor 708 such as a wire or the like, extending from the fastener 704, to a connecting pin 712 on the support 404. The conductor 708 may be coupled with the fastener 704 by a washer or the like.

Figure 8:
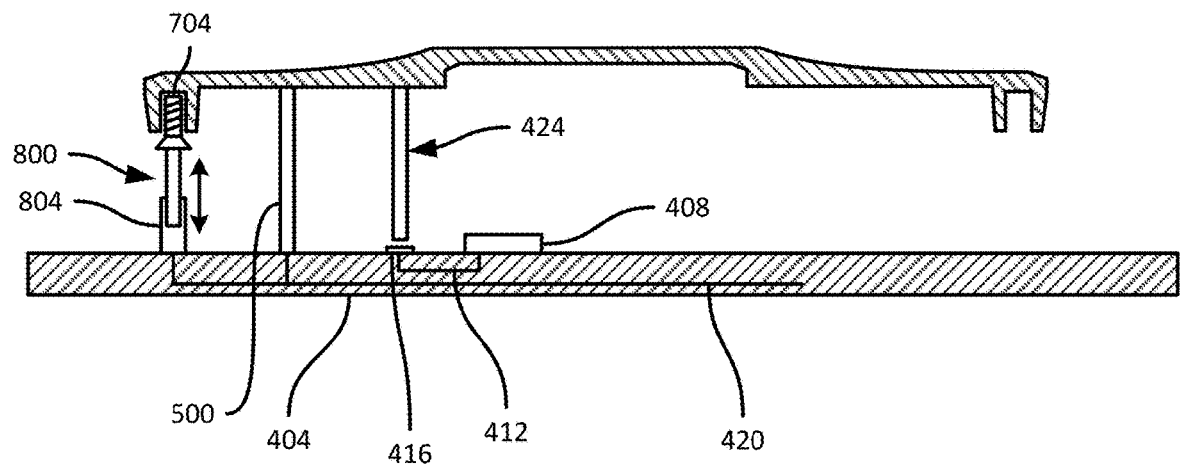
FIG. 8 is a simplified cross section of a mobile computing device, showing an example antenna configuration, including an alternative implementation for a shorting connector.

FIG. 8 illustrates a further embodiment, in which a second connector 800 is provided. The connector 800 includes the fastener 704, and a biased pin 804, such as a pogo pin. The pin 804 is biased towards an extended position, and when the support 404 (carrying the pin 804) is installed after the cleat 208 is affixed to the housing 104, the pin 804 compresses against the fastener 704, electrically connecting the fastener 704 with the ground plane 420.

Figure 9:
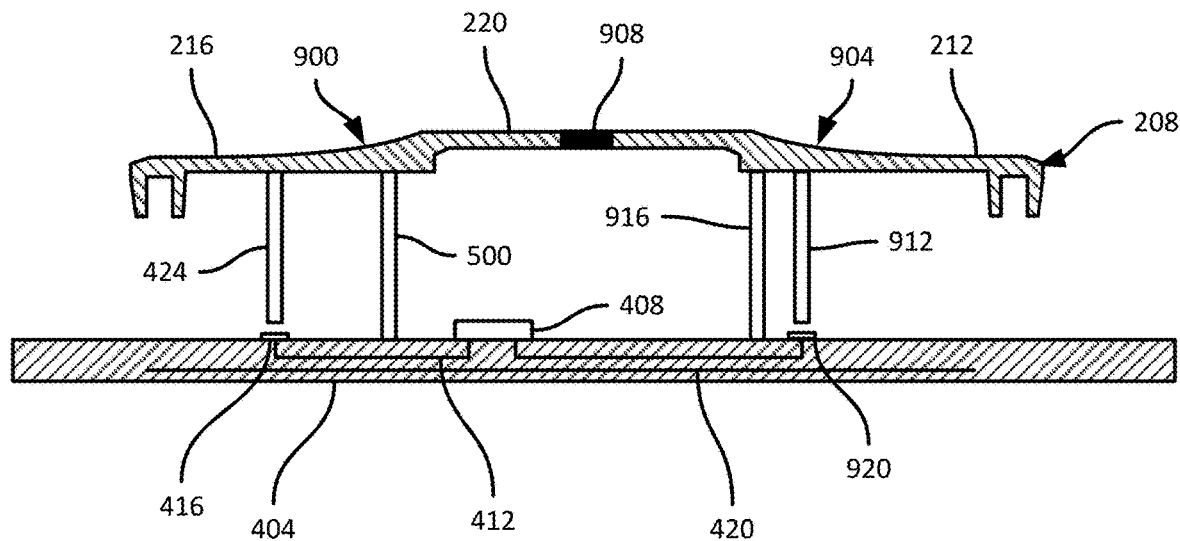
FIG. 9 is a simplified cross section of a mobile computing device, showing an example dual-antenna configuration.

In further examples, the cleat 208 can include two or more distinct conductive antenna elements, thus enabling the implementation of two or more antennas in the cleat 208. FIG. 9 illustrates an embodiment in which the cleat 208 includes a first conductive antenna element 900 defining the end portion 216 and part of the central portion 220, and a second conductive antenna element 904 defining the end portion 212 and another part of the central portion 220. The conductive antenna elements 900 and 904 are isolated from one another, for example, by an isolator 908, also referred to as a spacer, connected between the elements 900 and 904. Although each element 900 and 904 represents approximately one half of the cleat 208 in the example of FIG. 9, in other examples the division between conductive antenna elements need not be equal. In other examples, as noted earlier, the conductive elements 900 and 904 can be encased in a non-conductive material that also forms the spacer 908.

The device 100, in the example of FIG. 9, includes a feed connector 424, and can also include a shorting connector 500 (or more than one shorting connector) interconnecting the first element 900 with the support 404 as described earlier. The device 100 further includes a second feed connector 912, and a second shorting connector 916, interconnecting the second element 904 with the support 404. Specifically, the support 404 can carry an additional feed port 920 connected with the controller 408, to which the feed connector 912 is electrically coupled (although not necessarily mechanically coupled). As noted above, the positions of the feed and shorting connectors for each antenna element 900 and 904 may vary, depending on the performance targets for each antenna. Further, each antenna need not have the same number of shorting connectors. Each antenna may, for example, target a different frequency band (or multiple bands), e.g., to implement distinct communication standards. In other examples, the conductive antenna element 900 can implement a receiving antenna, while the conductive antenna element 904 can implement a transmitting antenna, for a given communication standard.

As shown in FIG. 9, the shorting connectors 500 and 916 are closer to one another than are the feed connectors 424 and 912. That is, a distance between the shorting connectors 500 and 916 is smaller than a distance between the feed connectors 424 and 912. Such an arrangement may reduce interference between the antenna elements 900 and 904. However, other arrangements of feed and shorting connectors (e.g., in which the feed connectors are closer to one another than the shorting connectors) are also contemplated.

Figure 10:
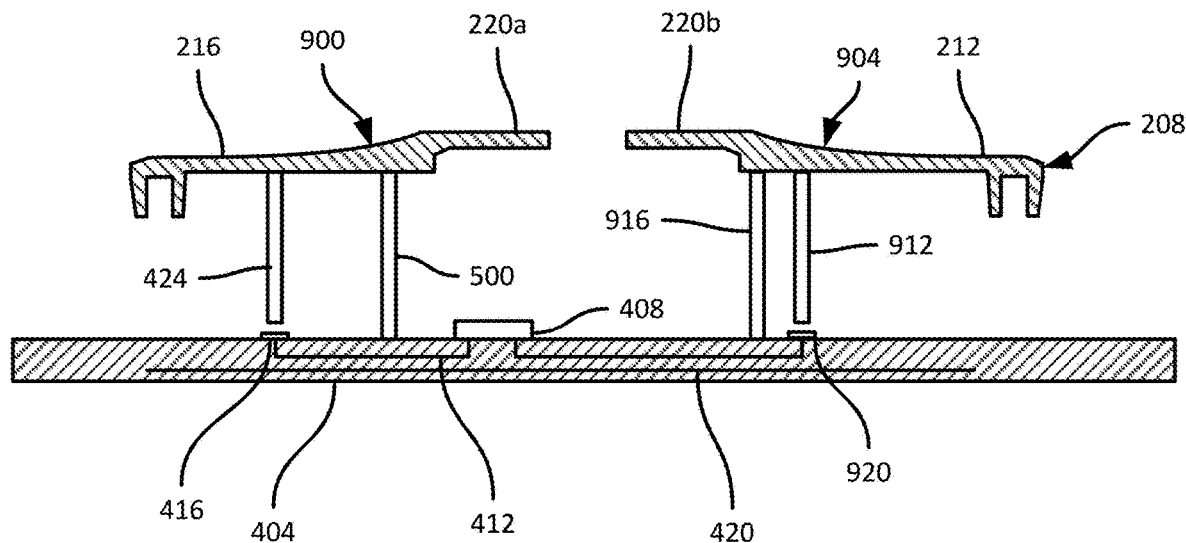
FIG. 10 is a simplified cross section of a mobile computing device, showing an example dual-antenna configuration.

As seen in FIG. 10, in some examples the isolation between first and second conductive antenna elements 900 and 904 can be provided by an air gap. That is, the cleat 208 can be deployed in two physically distinct portions, defined by the first and second conductive elements 900 and 904. In this example, the conductive element 900 defines the end portion 216 and a first central portion 220a, while the conductive element 904 defines the end portion 212 and a second central portion 220b. The central portions 200a and 200b can jointly engage with an accessory when the elements 900 and 904 are both installed onto the housing 104.

Figure 11:
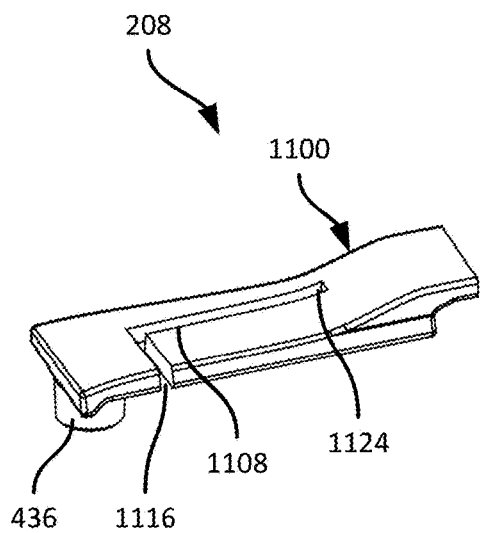
FIG. 11 is a diagram showing a perspective view of an accessory cleat implementing an antenna.
Figure 11:
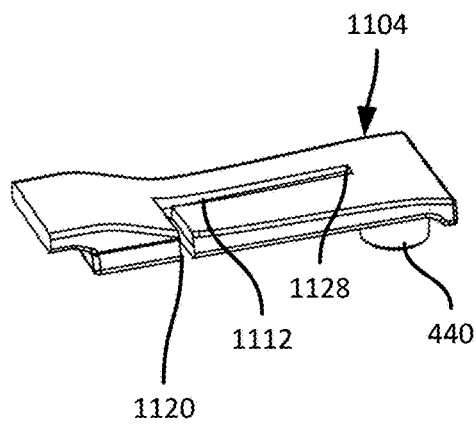
Figure 12:
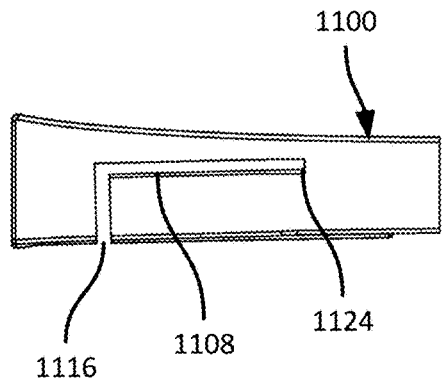
FIG. 12 is a back view of the cleat of FIG. 11.
Figure 12:
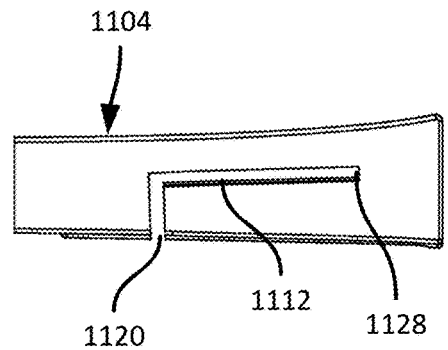

In further examples, the cleat 208 can include additional features to tune the antenna performance thereof. For example, turning to FIGS. 11 and 12, in addition to or instead of the shorting connectors mentioned above, the conductive element(s) of the cleat 208 can include one or more slots that alter the resonance frequencies of the conductive elements. FIG. 11 illustrates a perspective view of the cleat 208 according to some embodiments, and FIG. 12 illustrates a back view of the cleat 208 shown in FIG. 11. The cleat 208, in this example, includes two distinct conductive elements 1100 and 1104. Although the elements 1100 and 1104 are shown as being physically distinct, in other examples they can be connected by an isolator as discussed in connection with FIG. 9.

At least one of the conductive elements 1100 and 1104 includes a slot extending therethrough. In the illustrated example, the element 1100 includes a slot 1108, and the element 1104 includes a slot 1112. The slots 1108 and 1112 extend through the entire thickness of each of the respective elements 1100 and 1104 in this example. The slots 1108 and 1112 further include respective open ends 1116 and 1120 at an edge of the corresponding element 1100 and 1104, and respective closed ends 1124 and 1128. The geometry of the slots 1108 and 1112 can be selected according to the performance targets of the conductive antenna elements 1100 and 1104. As will be apparent, the slots 1108 and 1112 may enable the conductive antenna elements 1100 and 1104 to operate as dual-band antennas.

Figure 13:
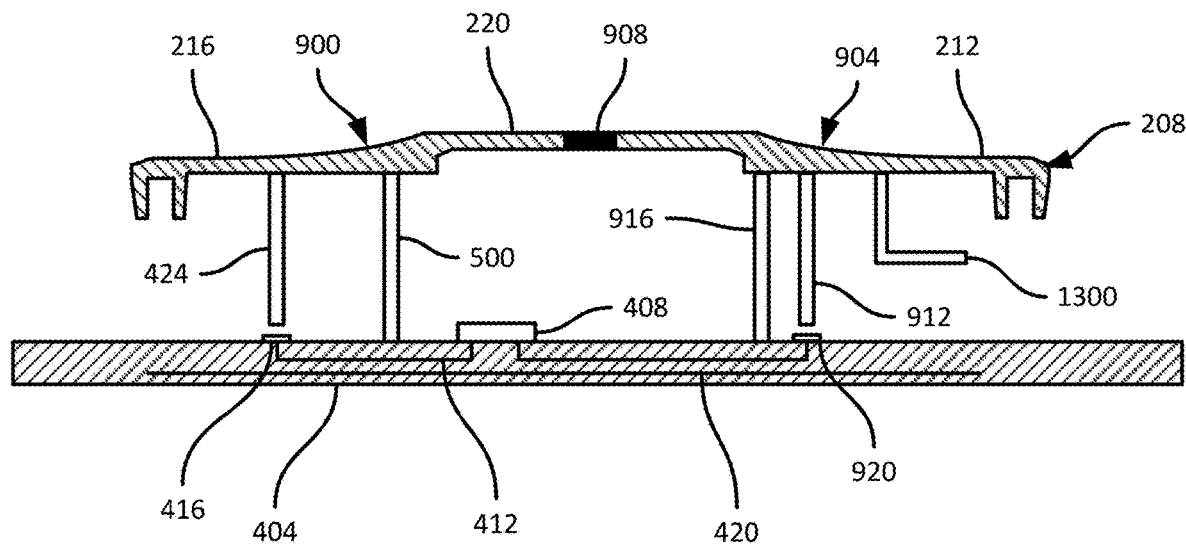
FIG. 13 is a simplified cross section of a mobile computing device, showing an example dual-antenna configuration.

Turning to FIG. 13, in further examples, the device 100 can include a load element affixed to a conductive antenna element of the cleat 208. For example, the conductive antenna element 904 is connected to a load 1300, such as a strip of conductive material supported on an internal surface of the housing 104. The shape and length of the load 1300 can be selected according to the performance targets of the antenna implemented by the conductive antenna element 904. In other examples the conductive antenna element 900 can also include a load (not necessarily of the same shape and position of the load 1300).

Figure 14:
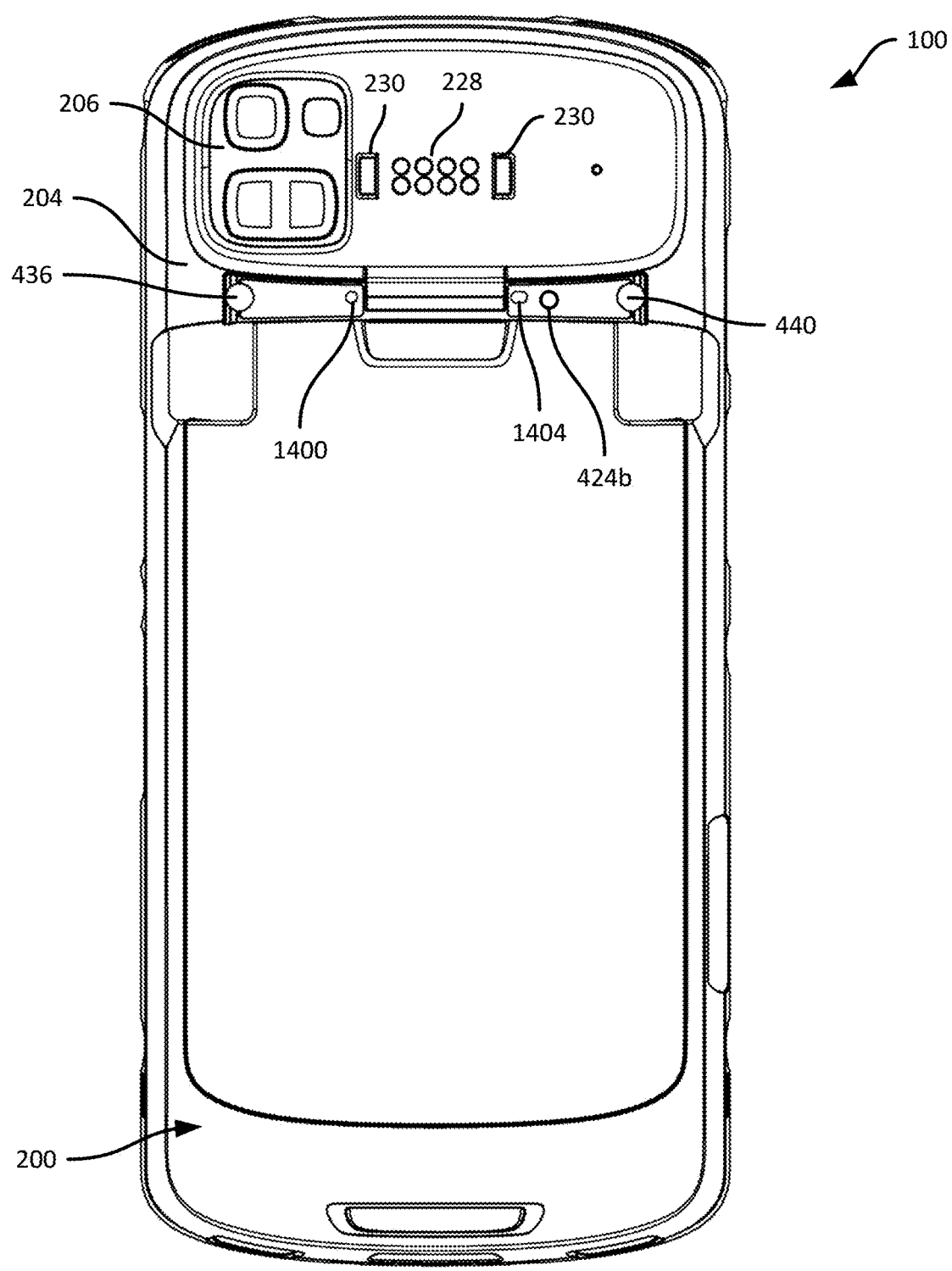
FIG. 14 is a diagram showing a back of the mobile computing device of FIG. 1, omitting the cleat.

Turning to FIG. 14, the back of the device 100 is illustrated, with the cleat 208 omitted. As seen in FIG. 14, the exterior end 424b of the feed connector 424 is exposed at the back surface 204 of the device 100, in order to engage with the cleat 208 upon installation of the cleat 208. When other connectors (e.g., shorting connectors, additional feed connectors) are included in the device 100, the exterior ends of such connectors can also be exposed at the back surface 204. The cleat 208 may include, for example, a biased member such as a spring finger on the interior surface thereof, to engage with the exterior ends of connectors on the back surface 204. In other examples, such a biased member can be omitted, and the interior surface(s) of the cleat 208 can engage directly with the connector ends exposed at the back surface 204.

FIG. 14 also illustrates recesses 1400 and 1404 in the back surface 204, corresponding to the protrusions 448 and 444, respectively, mentioned in connection with FIG. 4. Further, the openings 436 and 440 are also visible in FIG. 14, for receiving the recesses 432 and 428 of the cleat 208, as well as the fasteners mentioned earlier.

Figure 15:
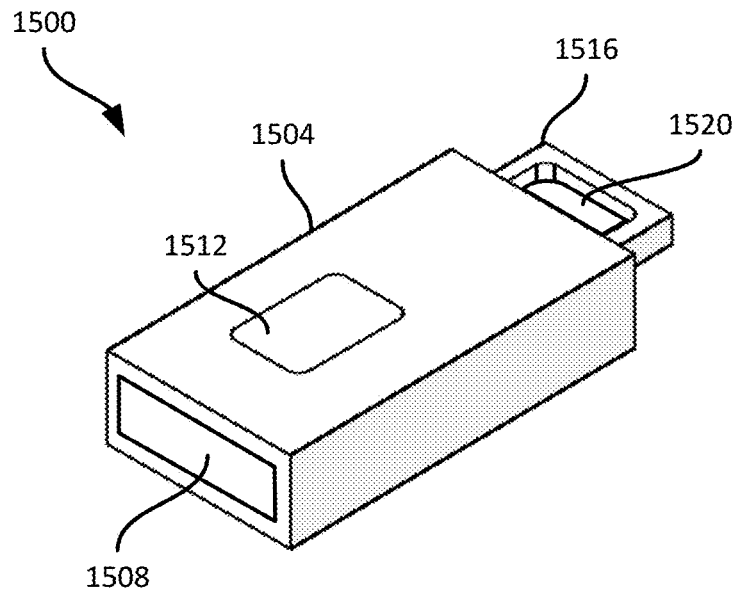
FIG. 15 is a diagram showing another example mobile computing device.

As noted earlier, a wide variety of device form factors may include cleats with at least some of the features described above, particularly the capability to affix an accessory to the device and to operate as an antenna. FIG. 15 illustrates a further example device 1500, in the form of a portable barcode scanner. The device 1500 includes a housing 1504 supporting various components, including a scan window 1508 and a button 1512 or other actuator configured to activate a scan function of the device 1500. The device 1500 also includes a cleat 1516 extending outwards from a rear wall thereof, and defining a gap 1520 between the cleat 1516 and the housing 1504. The cleat 1516 enables attachment of an accessory such as a lanyard, carrying strap, or the like, to the device 1500.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A mobile computing device, comprising:
a display;
a device housing supporting the display and having a wall defining an exterior surface;
a communications controller supported within a device interior enclosed between the display and the device housing;
a cleat affixed to the exterior surface of the wall and configured to couple an accessory to the device housing, the cleat including a conductive antenna element; and
a feed connector having an exterior end electrically coupled with the conductive antenna element of the cleat, an interior end electrically coupled with the communications controller, and a body traversing the wall to join the exterior and interior ends.

2. The mobile computing device of claim 1, wherein the device housing includes (i) a back wall substantially parallel to the display and defining the exterior surface, and (ii) a plurality of side walls connecting the back wall to the display.

3. The mobile computing device of claim 1, wherein the cleat includes a first end portion and a second end portion affixed to the exterior surface, and a central portion extending between the first and second end portions to define a gap between the central portion and the exterior surface.

4. The mobile computing device of claim 3, wherein the cleat is configured to couple the accessory to the device housing by receiving a portion of the accessory through the gap.

5. The mobile computing device of claim 1, further comprising an electrical ground plane supported within the device interior.

6. The mobile computing device of claim 5, further comprising a shorting connector electrically connecting the conductive antenna element with the ground plane.

7. The mobile computing device of claim 6, wherein the wall includes an opening therethrough; and
wherein the device includes a conductive fastener configured to extend from the device interior, through the opening, to engage with the conductive antenna element; and
wherein the shorting connector includes the conductive fastener.

8. The mobile computing device of claim 7, wherein the shorting connector further includes a conductive member extending from the fastener to the ground plane.

9. The mobile computing device of claim 5, further comprising a support member in the device interior, carrying the communications controller and defining the ground plane.

10. The mobile computing device of claim 1, wherein the conductive antenna element includes a slot extending therethrough.

11. The mobile computing device of claim 10, wherein the slot extends from an open end at an edge of the cleat, to a closed end.

12. The mobile computing device of claim 1, wherein the cleat includes a second conductive antenna element electrically isolated from the conductive antenna element; and
wherein the device includes a second feed connector electrically coupled with the communications controller.

13. The mobile computing device of claim 12, wherein the cleat includes a non-conductive spacer joining respective ends of the first and second conductive antenna elements.

14. The mobile computing device of claim 12, further comprising:
   an electrical ground plane supported within the device housing;
   a first shorting connector electrically coupling the conductive antenna element with the electrical ground plane; and
   a second shorting connector electrically coupling the second conductive antenna element with the electrical ground plane.

15. The mobile computing device of claim 14, wherein a distance between first and second shorting connectors is smaller than a distance between the feed connector and the second feed connector.

16. The mobile computing device of claim 1, wherein the exterior end of the feed connector is at the exterior surface of the wall.

17. A mobile computing device, comprising:
   a device housing having a wall defining an exterior surface, the device housing defining a device interior;
   a communications controller supported within the device interior;
   a conductive cleat affixed to the exterior surface of the wall and configured to couple an accessory to the device housing; and
   a feed connector extending from the device interior, through the wall, to the conductive cleat to electrically couple the conductive cleat with the communications controller.

18. The mobile computing device of claim 17, further comprising an electrical ground plane supported within the device interior.

19. The mobile computing device of claim 18, further comprising a shorting connector electrically connecting the conductive cleat with the ground plane.

20. The mobile computing device of claim 17, wherein the conductive cleat includes a first conductive antenna element, and a second conductive antenna element, and wherein the device further comprises a second feed connector electrically coupling the second conductive antenna element with the communications controller.

* * * * *